(12) United States Patent
Perrin et al.

(10) Patent No.: US 12,546,144 B2
(45) Date of Patent: Feb. 10, 2026

(54) BOWDEN CABLE ASSEMBLY FOR A VEHICLE DOOR HANDLE

(71) Applicant: MINEBEA ACCESSSOLUTIONS FRANCE, Alfortville (FR)

(72) Inventors: Christophe Perrin, Alfortville (FR); Thomas Lanno, Alfortville (FR)

(73) Assignee: MINEBEA ACCESSSOLUTIONS FRANCE, Alfortville (FR)

( * ) Notice: Subject to any disclaimer, the term of this patent is extended or adjusted under 35 U.S.C. 154(b) by 0 days.

(21) Appl. No.: 18/572,057

(22) PCT Filed: Jun. 16, 2022

(86) PCT No.: PCT/EP2022/066465
§ 371 (c)(1),
(2) Date: Dec. 19, 2023

(87) PCT Pub. No.: WO2022/268636
PCT Pub. Date: Dec. 29, 2022

(65) Prior Publication Data
US 2024/0301727 A1    Sep. 12, 2024

(30) Foreign Application Priority Data

Jun. 24, 2021   (EP) .................................... 21315113

(51) Int. Cl.
*E05B 79/20*    (2014.01)
*E05B 53/00*    (2006.01)
*F16C 1/12*     (2006.01)

(52) U.S. Cl.
CPC ............ *E05B 79/20* (2013.01); *E05B 53/005* (2013.01); *F16C 1/12* (2013.01)

(58) Field of Classification Search
CPC .......... E05B 79/20; F16C 1/102; F16C 1/145; F16C 1/14
See application file for complete search history.

(56) References Cited

U.S. PATENT DOCUMENTS 5,531,489 A * 7/1996 Cetnar .................... F16C 1/262
                                                            292/225
2003/0047340 A1   3/2003 Birt
(Continued)

FOREIGN PATENT DOCUMENTS

DE    10 2018 204 351 A1    9/2019
FR    2 900 700 A1          11/2007
FR    2982921 A1 *          5/2013 ............. F16C 1/102

OTHER PUBLICATIONS

EPO Machine Translation of the Description of DE 102018204351 A1, Stralkowski et al., Sep. 26, 2019. (Year: 2025).*

(Continued)

*Primary Examiner* — Daniel D Yabut
(74) *Attorney, Agent, or Firm* — Oblon, McClelland, Maier & Neustadt, L.L.P.

(57) ABSTRACT

A Bowden cable assembly for a vehicle door handle includes a Bowden cable having a first section connected to a first end-piece and a second section connected to a second end-piece, the first end-piece being configured to interact with the vehicle door handle and the second end-piece being configured to interact with a locking system configured to unlock a vehicle door when the vehicle door handle is being pulled by a user. The first end-piece and the second end-piece each includes a sleeve with a tip forming an abutment, and the abutments formed by the tips of the sleeves of the first end-piece and the second end-piece are configured to make contact with each other so as to block a translation of the Bowden cable when the Bowden cable has been pulled for a predetermined distance.

9 Claims, 9 Drawing Sheets

(56) References Cited

U.S. PATENT DOCUMENTS

| | | | | |
|---|---|---|---|---|
| 2003/0173863 A1* | 9/2003 | Butera | ...................... | F16C 1/12 |
| | | | | 310/307 |
| 2004/0237699 A1* | 12/2004 | Kinoshita | ............. | E05F 11/488 |
| | | | | 74/502.6 |
| 2008/0047112 A1* | 2/2008 | Hoekstra | ................ | E05B 79/20 |
| | | | | 24/457 |

OTHER PUBLICATIONS

International Search Report issued Sep. 22, 2022 in PCT/EP2022/066465, filed on Jun. 16, 2022, 3 pages.

* cited by examiner

[Fig.1]
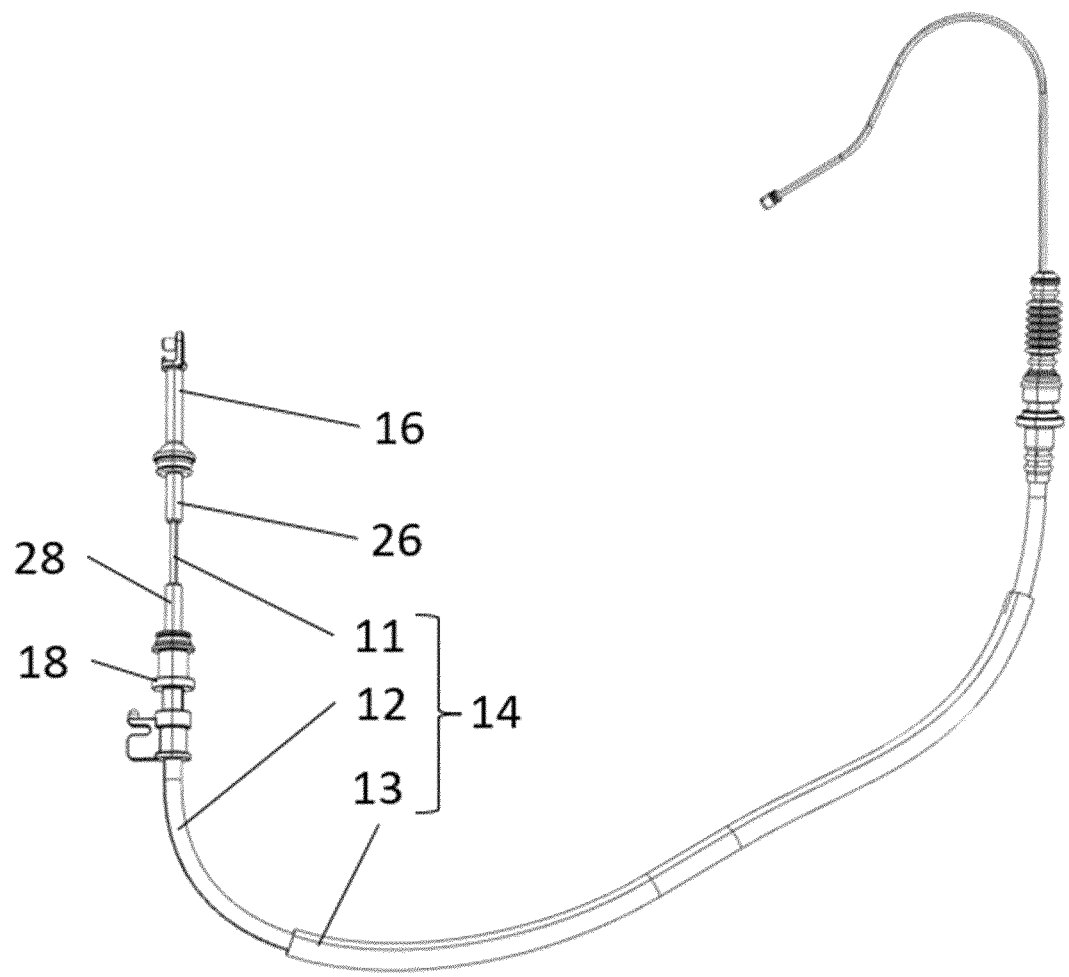

[Fig.2]
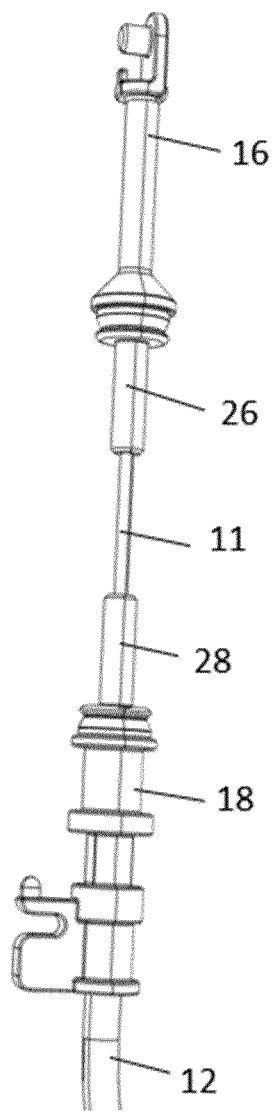

[Fig.3a]
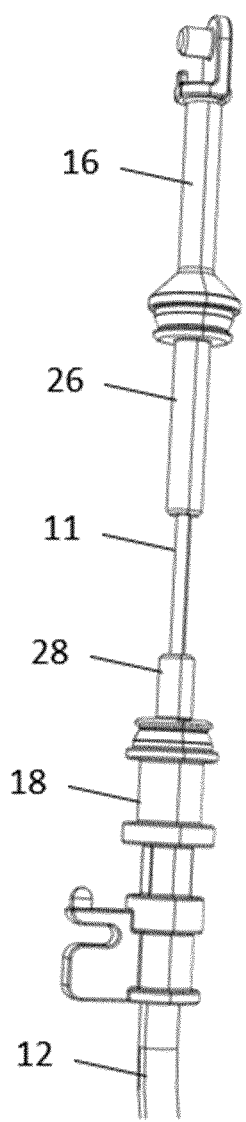

[Fig.3b]
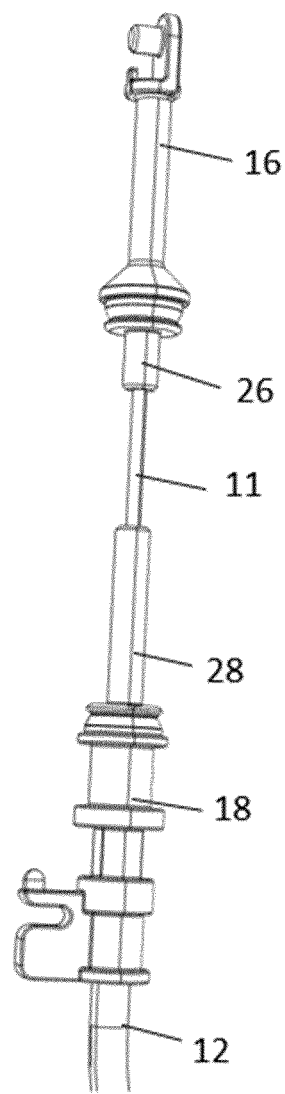

[Fig.4a]
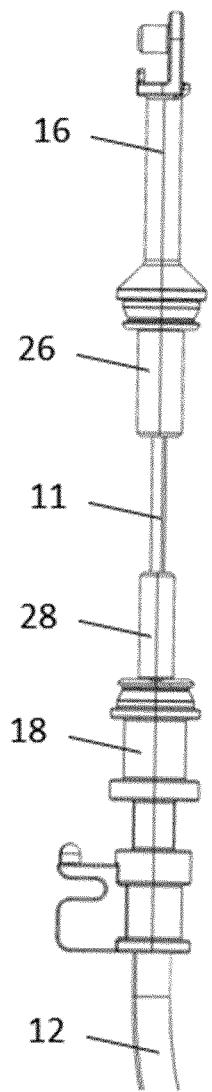

[Fig.4b]
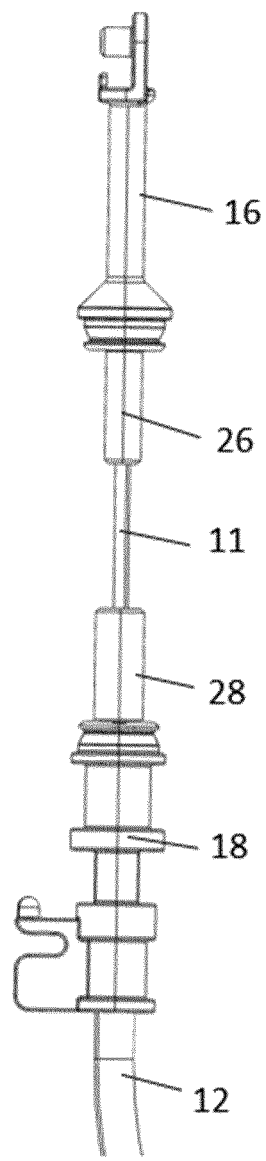

[Fig.5]
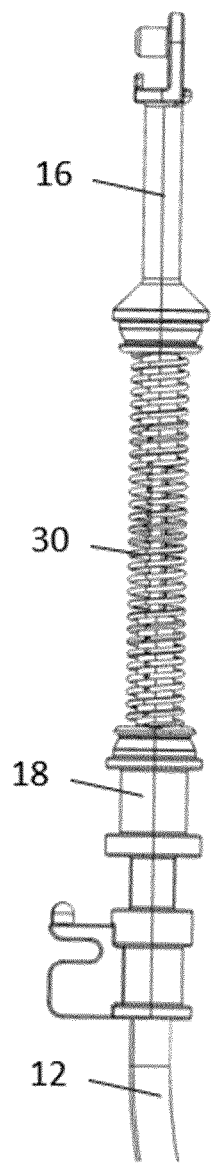

[Fig.6]
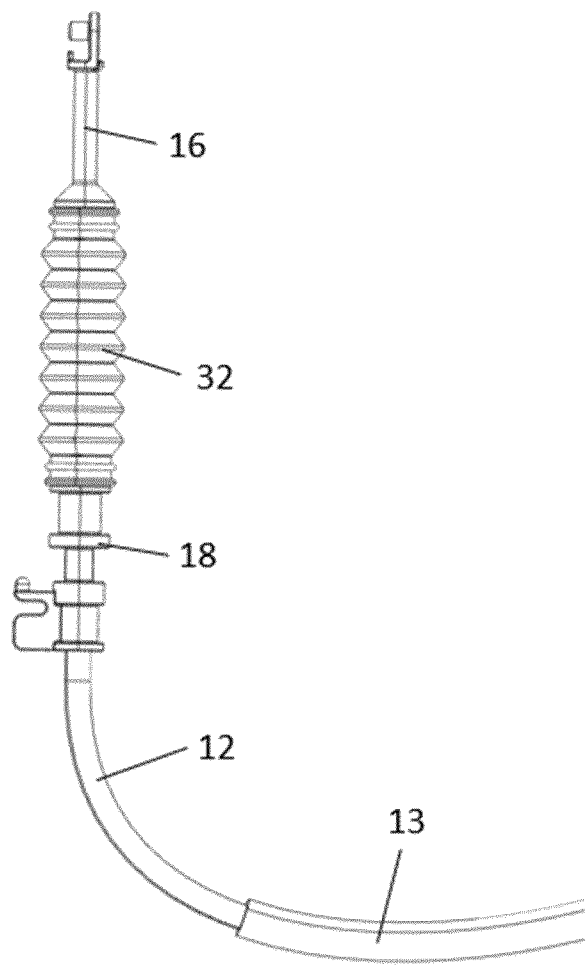

[Fig.7]
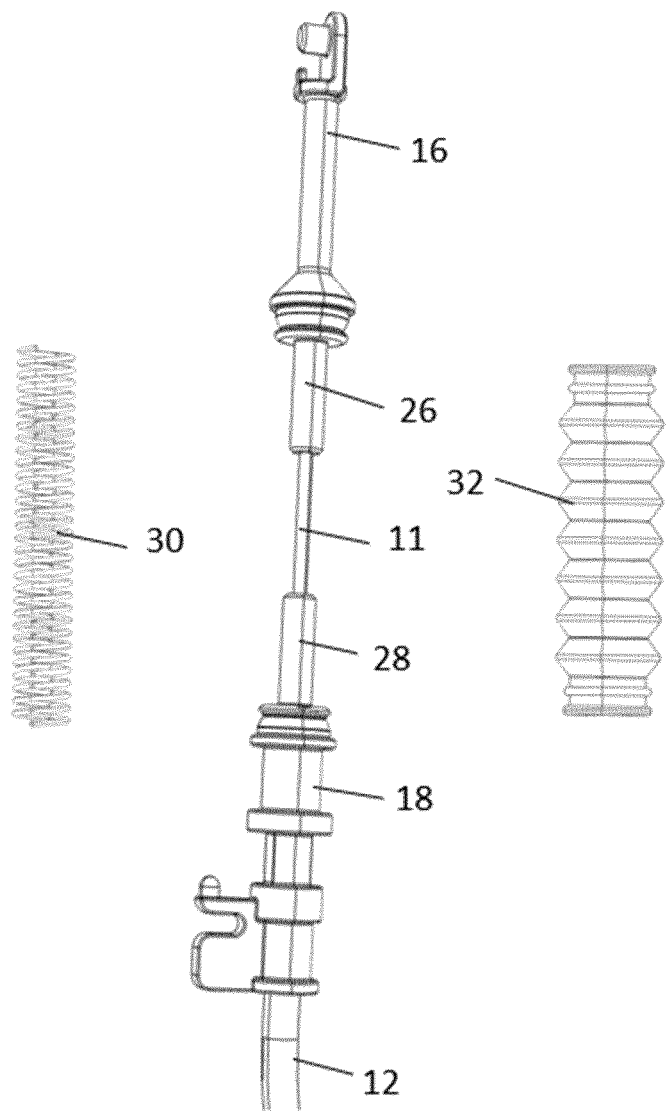

BOWDEN CABLE ASSEMBLY FOR A VEHICLE DOOR HANDLE

TECHNICAL FIELD

The present invention relates to the field of vehicle door handles to control the opening of vehicle doors and in particular to vehicle door handles comprising a Bowden cable configured to transmit mechanical force or energy by the movement of this Bowden cable. At least two sections of the Bowden cable are connected to specific parts of the vehicle door handle assembly so that when the user pulls the handle located on the outer door panel of the vehicle, the Bowden cable is being pulled, which then causes a locking system to unlock the door of the vehicle so that it can be opened.

BACKGROUND OF THE INVENTION

In the Bowden cable assembly for vehicle door handles of the state of the art, one end of the Bowden cable is fixed to a first end-piece which itself is fixed on a bracket of the vehicle door handle and another section of the Bowden cable is fixed to a second end-piece which is for instance connected to a lever that is designed to rotate when the exterior door handle is being pulled by a user. When the user pulls the exterior door handle, the lever is put into motion, hence generating a translation displacement of the internal wire of the Bowden cable. This motion of the handle, the lever and the Bowden cable leads to an unlocking of the mechanism which enables a user to open the door. The exterior handle can be mechanical or it can comprise electrical functions which might help locking and/or unlocking the vehicle door.

However, a Bowden cable can only sustain a certain amount of pulling force. Such Bowden cables usually interact with a translation stop which is configured to stop the translation movement of the internal wire of the Bowden cable when it is being pulled on, hence preventing any damage. Such translation stops are usually provided on different parts of the door handle assembly. A translation stop can for example be a plastic or metal protrusion ex-tending from the bracket of the vehicle door handle. In this case, the protrusion is there to stop the rotation of the lever. Blocking the rotation of the lever prevents any further translation of the Bowden cable. Such state-of-the-art-examples show that although translation stops are usually provided in such vehicle door handle mechanisms, these embodiments require a large number of parts which then add complexity to the door opening mechanism.

Moreover, the translation distance along which the internal wire of the Bowden cable is pulled must be exact and the pulling operation must be easily repeatable a large number of times, preferably in an identical manner. Avoiding distance dispersion helps protecting the parts of the door handle assembly from unusual wear and also ensures a safe functioning of the door handle mechanism. A short kinematic chain for these moving parts is hence preferable.

SUMMARY OF THE INVENTION

It is therefore a goal of the present invention to overcome at least partially the previous drawbacks of the state of the art and to provide a solution with less parts that helps avoiding premature wear leading to potential breakage of the Bowden cable assembly without complicating the mechanism of the vehicle door handle and without making the door handle more expensive.

Thus, the present invention refers to a Bowden cable assembly for vehicle door handle, the Bowden cable assembly comprising a Bowden cable having a first section connected to a first end-piece and a second section connected to a second end-piece, the first end-piece being destined to interact with the door handle and the second end-piece being destined to interact with a locking system configured to unlock the vehicle door when the door handle is being pulled by a user, wherein the first end-piece and the second end-piece each comprise a sleeve with a tip forming an abutment and wherein the abutments formed by the tips of the sleeves of the first end-piece and the second end-piece are configured to make contact with each other so as to block a translation of the Bowden cable when it has been pulled a predetermined distance.

According to a further aspect of the invention, the sleeves both present a cylindrical shape.

According to a further aspect of the invention, the cylindrical-shaped sleeves both have a same diameter.

According to a further aspect of the invention, the diameter of one of the cylindrical-shaped sleeves is larger than the diameter of the other cylindrical-shaped sleeve.

According to a further aspect of the invention, the sleeves of the end-pieces have the same length.

According to a further aspect of the invention, the sleeves of the end-pieces have different lengths.

According to a further aspect of the invention, the Bowden cable assembly comprises an additional spring placed around at least one of the sleeves in order to ensure sufficient return force for the Bowden cable when the door handle is released by the user.

According to a further aspect of the invention, at least part of the spring coils surrounds the exterior of at least one of the two sleeves.

According to a further aspect of the invention, the Bowden cable assembly comprises an additional protective covering designed to fit around the sleeves.

BRIEF DESCRIPTION OF THE DRAWINGS

FIG. 1 is a perspective view of a Bowden cable assembly according to a first embodiment of the invention;

FIG. 2 is a detailed perspective view of the first embodiment of the invention shown in FIG. 1;

FIG. 3a is a figure similar to FIG. 2 illustrating a first variant of a second embodiment of the invention;

FIG. 3b is a figure similar to FIG. 3a illustrating a second variant of the second embodiment;

FIG. 4a is a figure similar to FIGS. 3a and 3b and is illustrating a first variant of a third embodiment of the invention;

FIG. 4b is a figure similar to FIG. 4a illustrating a second variant of the third embodiment of the invention;

FIG. 5 is a figure similar to FIG. 2 illustrating a fourth embodiment of the invention;

FIG. 6 is another figure similar to FIG. 2 illustrating a fifth embodiment of the invention.

FIG. 7 is an exploded view of the fifth embodiment of the invention.

DETAILED DESCRIPTION OF THE INVENTION

The following achievements are examples. Although the specification refers to one or several embodiments, it does not imply that each reference refers to the same embodiment or that the features apply only to a single embodiment.

Simple features of different embodiments can also be combined to provide other embodiments. In the following description, certain items can be indexed, as the first item or second item. This is a simple indexing to differentiate and name similar but not identical elements. This indexing does not imply a priority of one element over another and such names can easily be interchanged without going beyond the scope of the present description. Nor does this indexing imply an order in time.

FIG. 1 is a schematic view of a Bowden cable assembly 10 comprising a Bowden cable 14 with an internal wire 11, an external tube 12 placed around the internal wire 11 and optionally a noise protection tube 13 placed around the external tube 12. The noise protection tube 13 is usually shorter than the external tube 12 and the external tube 12 is shorter than the internal wire 11.

There are several possibilities for integrating a translation stop for the Bowden cable 14 within Bowden cable assembly 10 itself. Generally, the Bowden cable 14 has a first section that is connected to a first end-piece 16 and a second section is connected to a second end-piece 18. In the case depicted in FIG. 1, the first section is one end of the internal wire 11 of the Bowden cable 14. The first end-piece 16 can for example be crimped on the tip of the internal wire 11. The first end-piece 16 is also usually destined to interact with the vehicle door handle latch. In the case depicted in FIG. 1, the second end-piece 18 is connected to the end of the external tube 12 of the Bowden cable 14 that is closest to the first end-piece 16. The second end-piece 18 is usually destined to interact with the latch configured to unlock the vehicle door when the door handle is being pulled by a user.

These end-pieces 16, 18 are usually made of metal or of plastic and are therefore solid, meaning that when used normally, the end-pieces 16, 18 are not subject to deformation. These end-piece 16, 18 are designed to arrange at least part of the Bowden cable 14 inside the vehicle door handle mechanism (which is not depicted here) and make sure that the Bowden cable assembly 10 interacts correctly in the kinematic chain.

According to the invention, the first end-piece 16 and the second end-piece 18 each comprise a sleeve 26, 28 through which the internal wire 11 of the Bowden cable 14 passes. The sleeves 26 and 28 can be made of the same material as the end-pieces 16, 18. Alternatively, the sleeves 26 and 28 can be separate attachments that are respectively fixed to the end-pieces 16, 18. It is essential that these sleeves 26, 28 are solid, meaning that they are not subject to deformation when used properly.

The end-pieces 16 and 18 are attached to the Bowden cable 14 in such a way that the tip of the two sleeves 26, 28 face each-other. Pulling the internal wire 11 through the external tube 12 of the Bowden cable 14 moves the two end-pieces 16, 18 closer together until the tip of their sleeves 26, 28 eventually touch.

The tip of the first sleeve 26 of the first end-piece 16 and the tip of the second sleeve 28 of the second end-piece 18 are configured to make contact with each other. More specifically, the tip of the sleeves 26 and 28 serve as abutments which are destined to be pressed against one another when the Bowden cable 14 and more specifically its internal wire 11 has been pulled a predetermined distance, hence blocking any further translation of the Bowden cable 14. The predetermined distance can be a few tens of millimeters, e.g., between ten and fifty millimeters and more specifically twenty millimeters.

Various embodiments of this invention are illustrated in FIGS. 2, 3a, 3b, 4a, 4b, 5, 6 and 7. In these figures, the first end-piece 16 comprising the first sleeve 26 is shown in the top part of the drawing and the second end-piece 18 comprising the second sleeve 28 is illustrated below the first end-piece 16. Part of the internal wire 11 of the Bowden cable 14 extends in a straight vertical line from one end-piece to the other one.

In all these examples of embodiments, the sleeves 26, 28 are hollow shafts through which the internal wire 11 of the Bowden cable 14 passes. The sleeves 26, 28 can serve as an additional protection for the internal wire 11. When in contact with each other, the sleeves 26, 28 act like a protective housing inside which at least one part of the Bowden cable 14 is safely stored.

The sleeves 26 and 28 can both have a cylindrical shape, which is a space-saving way to design them. In this specific case, the tips of the cylindrical-shaped sleeves 26 and 28 have an annular shape. The global shape of the sleeves 26 and 28 could be different, for instance their flat tips could present the shape of a polygon, however this alternative is not shown in the figures.

A first embodiment of the invention is illustrated in FIG. 2. According to this first embodiment, the diameter of both cylindrical sleeves 26, 28 are identical. The longitudinal axes of both sleeves 26, 28 are preferably coaxial in order to ensure a maximum contact surface between their annular-shaped tips when they touch each other. The sleeves 26, 28 also have the same length, meaning that the contact zone is located in the middle of the total length of the sleeves 26, 28 when the tips of the sleeves 26, 28 are pressed against each other.

A second embodiment of the invention is illustrated in FIGS. 3a and 3b. According to this second embodiment, the cylindrical hollow shafts forming the sleeves 26 and 28 on both end-pieces 16, 18 have identical diameters, but they have different lengths. FIG. 3a shows a first variant of this second embodiment in which the first end-piece 16 comprises a sleeve 26 with a longer cylindrical hollow shaft than the sleeve 28 of the second end-piece 18. FIG. 3b shows a second variant in which it is the exact opposite: the cylindrical hollow shaft forming the sleeve 28 on the second end-piece 18 is longer than the first sleeve 26 of the first end-piece 16. Configurations like these two variants of the second embodiment might allow more different parts arrangement of the Bowden cable assembly 10 inside the vehicle door handle mechanism than the first embodiment depicted in FIG. 2 does.

A third embodiment of the invention is illustrated in FIGS. 4a and 4b. According to this third embodiment, the cylindrical hollow shafts forming the sleeves 26 and 28 respectively on the end-pieces 16 and 18 do not have the same diameter, meaning that one sleeve is larger than the other one. FIG. 4a shows a first variant of this third embodiment in which the diameter of the sleeve 26 of the first end-piece 16 is larger than the diameter of the sleeve 28 of the second end-piece 18. FIG. 3b shows a second variant in which it is the exact opposite: the diameter of the second sleeve 28 on the second end-piece 18 is larger than the diameter of the first sleeve 26 of the first end-piece 16. Having a larger diameter for one of the two sleeves 26 or 28 ensures having a sufficient contact surface when the tip of the sleeves 26 and 28 meet, even if the axes of the cylindrical hollow shafts forming the two sleeves 26, 28 are not well aligned.

A fourth embodiment of the invention is illustrated in FIG. 5. According to this fourth embodiment, the Bowden cable assembly 10 comprises an additional spring 30 placed around at least one of the sleeves 26, 28 in order to ensure sufficient return force when the tension is released from the Bowden cable 14. Adding the spring 30 into the mechanism can help limiting displacement errors which might occur when the Bowden cable assembly 10 is repeatedly used. The inner diameter of the spiral-formed spring coil is slightly larger than the diameter of the sleeves 26, 28, which are at least partly placed inside the spiral-formed spring coil. As can be seen in FIG. 5, part of the spring coils surrounds the exterior of at least one of the sleeves 26, 28, or both of them. In other words: the sleeves 26, 28 are placed inside the spiral-formed spring coil. This ensures that the spring 30 is guided by both sleeves 26 and 28 of the first end-piece 16 and the second end-piece 18.

A fifth embodiment of the invention is illustrated in FIG. 6. In this fifth embodiment of the invention, the Bowden cable assembly 10 comprises an additional protective covering 32 placed around the sleeves 26, 28 of the first end-piece 16 and the second end-piece 18. The protective covering 32 hence covers the tips of the sleeves 26, 28 and at least part of the internal wire 11 of the Bowden cable 14 passing through these sleeves 26, 28. If the additional spring 30 is also provided, the protective covering 32 is designed to fit around the additional spring 30. This additional protective covering 32 can also ensure the tightness of the Bowden cable assembly 10 by protecting it from polluting elements coming from the exterior, like dirt. The protective covering 32 can be a bellow cover having a generally cylindrical shape. A bellow cover helps protecting at least one part of the Bowden cable assembly 10 in all positions, whether the tips of the sleeves 26, 28 touch or not. Even when no tension is put on the Bowden cable 14 so that there is a gap between the tip of both sleeves 26 and 28, the bellow cover can still protect them from exterior polluting elements.

Thanks to the sleeves 26 and 28 placed directly on the end-pieces 16 and 18 placed on two distinct sections of the Bowden cable 14, an integrated translation stop can be provided for this Bowden cable assembly 10.

It is therefore possible to provide a Bowden cable assembly 10 for a vehicle door handle with a less complex design that involves fewer parts and that requires less space.

The invention claimed is:

1. A Bowden cable assembly for a vehicle door handle, comprising:
a Bowden cable having a first section connected to a first end-piece, the first end-piece surrounding a first portion of the Bowden cable, and a second section connected to a second end-piece, the second end-piece surrounding a second portion of the Bowden cable distinct from the first portion, the first end-piece being configured to interact with the vehicle door handle and the second end-piece being configured to interact with a locking system configured to unlock a vehicle door when the vehicle door handle is being pulled by a user, wherein
the first end-piece and the second end-piece each comprises a sleeve with a tip forming an abutment,
the abutments formed by the tips of the sleeves of the first end-piece and the second end-piece are configured to make contact with each other so as to block a translation of the Bowden cable when the Bowden cable has been pulled for a predetermined distance, and
the first end-piece and the second end-piece are attached to the Bowden cable such that the tips of the sleeves face each other.

2. The Bowden cable assembly in accordance with claim 1, wherein the sleeves both present a cylindrical shape.

3. The Bowden cable assembly in accordance with claim 2, wherein the cylindrical-shaped sleeves both have a same diameter.

4. The Bowden cable assembly in accordance with claim 2, wherein a diameter of one of the cylindrical-shaped sleeves is larger than a diameter of another one of the cylindrical-shaped sleeves.

5. The Bowden cable assembly in accordance with claim 1, wherein the sleeves of the first and second end-pieces have a same length.

6. The Bowden cable assembly in accordance with claim 1, wherein the sleeves of the first and second end-pieces have different lengths.

7. The Bowden cable assembly in accordance with claim 1, further comprising a spring placed around at least one of the sleeves configured to ensure a return force for the Bowden cable when the vehicle door handle is released by the user.

8. The Bowden cable assembly in accordance with claim 7, wherein at least part of the spring surrounds an exterior of the at least one of the two sleeves.

9. The Bowden cable assembly in accordance with claim 1, further comprising a protective covering designed to fit around the sleeves.

* * * * *